United States Patent [19]

Jensen

[11] 3,893,192

[45] July 1, 1975

[54] CONVERTER FOR MEASURED QUANTITIES

[75] Inventor: Arne Jensen, Sonderborg, Denmark

[73] Assignee: Danfoss A/S, Nordborg, Denmark

[22] Filed: Mar. 13, 1974

[21] Appl. No.: 450,592

Related U.S. Application Data

[63] Continuation of Ser. No. 270,975, July 12, 1972, abandoned.

[30] Foreign Application Priority Data

Feb. 25, 1971 Germany.......................... 2108892

[52] U.S. Cl............................ 324/65 R; 324/DIG. 1
[51] Int. Cl............................................. G01r 27/02
[58] Field of Search...................... 324/65 R, DIG. 1

[56] References Cited
UNITED STATES PATENTS

| | | | |
|---|---|---|---|
| 3,148,339 | 9/1964 | Bell et al...................... | 324/DIG. 1 |
| 3,203,223 | 8/1965 | Petrow.......................... | 324/DIG. 1 |
| 3,416,076 | 12/1968 | Clinton......................... | 324/DIG. 1 |
| 3,450,978 | 6/1969 | Norman......................... | 324/DIG. 1 |
| 3,503,261 | 3/1970 | Riester et al................. | 324/DIG. 1 |
| 3,517,556 | 6/1970 | Barker.......................... | 324/DIG. 1 |
| 3,562,729 | 2/1971 | Hurd............................. | 324/DIG. 1 |
| 3,675,122 | 7/1972 | Rose.............................. | 324/DIG. 1 |
| 3,680,384 | 8/1972 | Grindheim.................... | 324/DIG. 1 |

Primary Examiner—Stanley T. Krawczewicz

[57] ABSTRACT

The invention relates to a converter for measured quantities comprising at least one measuring resistance provided in a compensating bridge, the signal current for restoring the bridge balance being fed through a part of the fixed resistances of the bridge. The output that is required for operation is derived from the supervising current. The bridge is connected in series with a control element which varies the voltage across the bridge in such a way that the sum of the currents flowing through the entire bridge is substantially constant, the voltage drop at one of the fixed bridge resistances being used to form a control signal for influencing the control element. In a preferred form of the invention the bridge comprises first and second branches connected to a feed point with each branch consisting of a fixed resistance serving to form the control signal. A third branch comprises a fixed resistance with a tap for connecting the current path for the signal current and the first branch comprises at least one measuring resistance. This results in a very simply constructed bridge which, in the extreme case, makes do with four bridge elements which are two fixed resistances, a fixed resistance with a tap and a measuring resistance.

12 Claims, 8 Drawing Figures

CONVERTER FOR MEASURED QUANTITIES

This is a continuation of application Ser. No. 270,975, filed July 12, 1972, now abandoned.

The invention relates to a converter for measured quantities, comprising at least one measuring resistance provided in a compensating bridge, the signal current for restoring the bridge balance being fed through a part of the fixed resistances of the bridge.

Measuring systems are known for the most varied quantities such as temperature, humidity, pressure, liquid level or positions. To convert these quantities into suitable electric quantities, converters are used. These comprise a measuring circuit in which the quantity to be measured is converted to an electric parameter, e.g. with the aid of temperature-dependent resistances, strain gauges, capacity probes or adjustable resistances. Since the resultant electric signal is generally very small, the converter usually also incorporates an amplifier.

One converter for measured quantities is known in which a measuring resistance is provided in a compensating bridge. The compensating bridge and the amplifier are energised, through means for keeping the voltage constant, from a mains circuit provided at the position of use of the converter. A compensating current for restoring the bridge balance is fed through a fixed resistance of the bridge and serves as the signal current. One disadvantage in this case is that the place of use must be provided with a voltage supply.

In remote control measuring systems it is known to have a closed circuit current of 4 mA flowing continuously for the purpose of supervising the installation and to superimpose on this constant supervising current the actual signal current of 0–16 m A. In this connection it is also known to have the converter in the form of a dipole which is connected to the central control point by two signal lines and which is energised by a voltage source located at the central control point. For this purpose the converter comprises at least two current paths, of which the first is controllable in dependence on the measured value and permits a variable current, namely the signal current, to pass, whereas in the second a constant current, namely the sum of the supervising current, is continuously generated with the aid of constant current circuits. The constant current circuits are in series with constant voltage circuits from which the working voltage for the measuring circuit and the amplifier are derived. A normal measuring bridge may serve as the measuring circuit.

In many cases only a small voltage, for example in the order of 12–14 V, is available at the input of the converter. Since a constant current circuit comprises control resistances through which the current flows, there is a further voltage drop and thus, under the most unfavourable circumstances when the signal current is a maximum and the operating voltage a minimum, the voltage that is available for the measuring circuit is no longer adequate.

The invention aims to provide a converter for measured quantities in which the output that is required for operation is derived from the supervising current but in which, under the most unfavourable circumstances, a higher voltage is available for the measuring circuit than has hitherto been possible.

In a converter of the kind hereinbefore referred to, this aim is achieved in accordance with the present invention in that the bridge is connected in series with a control element which varies the voltage across the bridge in such a way that the sum of the currents flowing through the entire bridge is substantially constant, the voltage drop at one of the fixed bridge resistances being used to form a control signal for influencing the control element.

With such a converter, detrimental voltage drops caused by a constant current circuit are avoided. Instead, only a single control element need be provided in series with the bridge. The signals required for control are obtained by utilising the voltage drop at bridge resistances which must in any case be provided. Consequently a higher voltage than hitherto is available at the measuring circuit, namely at the bridge. What is surprising in this connection is that the bridge, even though the latter is under the influence of the control element at a variable voltage and is traversed by variable currents, can nevertheless be used to obtain constant current control signals.

The current flowing through the entire bridge can be kept more constant than in the case where the voltage drop across only one bridge resistance is used if use is made in the formation of the control signal of the voltage drop at the fixed resistances of two branches of the bridge adjacent a feed point. The currents in both halves of the bridge are thereby supervised and they will together result in the constant current.

The simplest case of supervision is obtained if means for forming the mean value of the voltage drops at the fixed resistances of the two bridge branches are provided and the mean value is comparable with a constant voltage for the purpose of forming the control signal.

Preferably, a controllable current path is provided which leads the signal current from a tapping at one bridge branch around the bridge and possibly also around the control element.

In a preferred form of the invention, the bridge comprises first and second branches connected to a feed point and each consisting of a fixed resistance serving to form the control signal, the third branch comprises a fixed resistance with a tap for connecting the current path for the signal current and the first branch comprises at least one measuring resistance. This results in a very simply constructed bridge which, in the extreme case, makes do with four bridge elements, namely two fixed resistances, a fixed resistance with tap and a measuring resistance.

On the other hand, such a bridge can be adapted to the most varied requirements if it is ensured that the bridge half adjacent the one feed point is retained to obtain the control signal and corresponding changes are made to the bridge half adjacent the other feed point.

For example, the third branch can likewise contain at least one measuring resistance which has a tendency to vary in the opposite sense to the measuring resistance in the fourth branch if this fourth branch is provided with an additional resistance corresponding to the fixed resistances in the third branch.

A differential amplifier in the bridge diagonal may be used as the means for forming the mean value. The voltage drop at the common emitter resistance is then compared with the constant voltage by a comparative transistor amplifier of which the output controls the control element. The emitter resistance that is in any case provided in a differential amplifier is then utilised to form the mean value.

In another form of the invention the means for forming the mean value comprises a voltage divider in the bridge diagonal, the voltage between the tap of the voltage divider and the feed point between the two fixed resistances of the bridge being comparable with a constant voltage for the purpose of forming the control signal. Since a current flows through the voltage divider that alternates through the diagonal from one side of the bridge to the other, a balanced mean value is obtained to fulfil even higher requirements of accuracy in keeping the current constant.

Good conditions are obtained if the two fixed bridge resistances are at respective substantially constant ratios to their adjacent sections of the voltage divider. The optimum condition obtains when the resistances are equal.

The voltage between the tap of the voltage divider and the feed point can then control one input of a comparative differential amplifier and the constant voltage can control the other input, the comparative differential amplifier influencing the control element through an output transistor. Instead, a comparative transistor amplifier of the aforementioned kind can be used.

It is of particular advantage to provide a differential amplifier in the bridge diagonal, this differential amplifier controlling, through an output transistor, a signal current transistor amplifier provided in the current path. This is a simple way of controlling the compensating current required to restore the bridge balance.

The differential amplifier controlling the signal current transistor amplifier can also serve to form the mean value. This will result in a very simple circuit construction.

For example, an output transistor may be provided of which the emitter is connected to the collector of the first transistor of the differential amplifier, the base is connected to the collector of the second transistor of the differential amplifier, and the collector is connected to the input base of the signal current transistor amplifier. The greater the deviation from the bridge balance, the larger will be the signal current.

Another form of the invention provides that, in addition to the first means which determine the signal current to restore the bridge balance, a second means is provided to restore the bridge balance, the one being effective when the diagonal voltage deviates from zero in one direction and the other being effective when the diagonal voltage deviates from zero in the other direction. In this way it will be possible to keep the current flowing through the entire bridge constant even if the measuring resistance has changed to a working point at which no signal current whatsoever would flow.

A particularly suitable second arrangement involves a controllable resistance, for example in the form of the collector-emitter path of a control resistor, which is parallel to part of a fixed resistance in one bridge branch. Whilst the voltage drop at one bridge branch will be increased by the signal current, the controllable resistance will result in a reduction of the voltage drop at the fixed resistance parallel therewith.

It is particularly favourable for the output transistor to be one which is complementary to the transistors of the differential amplifier, its emitter being connected to a collector working resistance of the differential amplifier, its base being connected to the collector of the first transistor of the differential amplifier, and its collector being connected through a junction to the collector of the second transistor of the differential amplifier, the differential current at the junction controlling the input base of the signal current transistor amplifier. This will result in a well amplified output current which is proportional to the difference between the input voltages. In addition this output value can be positive and negative in so far that the output current is reversed.

In this way one of the two means for restoring the bridge balance can be controlled in dependence on the current direction, for example in that the junction is connected to the base of the control transistor and that an additional transistor is provided of which the emitter is connected to the junction, the base is connected to the emitter of the control transistor and the collector is connected to the input base of the signal current transistor amplifier.

Other simplifications will result if the feed voltage for at least one differential amplifier is tapped from the feed points of the bridge. Similarly, means comprising a voltage stabiliser and voltage divider may be applied to the feed points of the bridge for the purpose of obtaining the constant voltage.

To set the constant sum of currents the voltage divider of the voltage stabiliser can be an adjustable resistance in a bridge path so as to set the zero point of the signal current and the tap for the current path for the signal current can be adjustable to set the sensitivity of the converter.

It is of particular advantage if the signal current amplifier and/or the control element amplifier is a Darlington amplifier, i.e. an amplifier consisting of transistors connected in cascade. This will result in excellent current amplification.

The converter of the invention is particularly suitable for remote control measuring systems in which it is connected by two signal lines to a central control where it is energised by a central voltage force. Neither a long length of signal lines nor fluctuations in voltage at the central voltage source will cause difficulties because the smallest available voltage is substantially completely applied to the measuring circuit.

In another form of the invention, each signal line may be provided at the central control with a resistance, preferably connected to the central voltage source, from which the voltage is tapped by a voltage discriminator. The voltage discriminator may be energised by the same voltage source. If the voltage exceeds or falls below a predetermined limiting value, the voltage discriminator becomes effective. It can, for example, control warning equipment which is likewise energised by the same central voltage source. Since all the essential elements are dependent on the same voltage source, it will be certain that all disruptive influences determined at the measuring point, e.g. excessive temperature or excessive pressure, will actually lead to the desired results at the central control.

The use of this central voltage source also permits provision of a central auxiliary voltage source which can be brought into operation by a reserve switch if the main central voltage source becomes inoperative. This will considerably increase the reliability of the entire remote control measuring system. The reserve switch can, for example, be controlled by a resistance or by a relay in the common return lead for all the signal conduits. If no current flows through this return lead then it can be assumed that the cause for this is the failure of the central voltage source rather than defects in individual signal conduits.

Examples of the invention will now be described with reference to the accompanying drawings in which.

Figure 1:
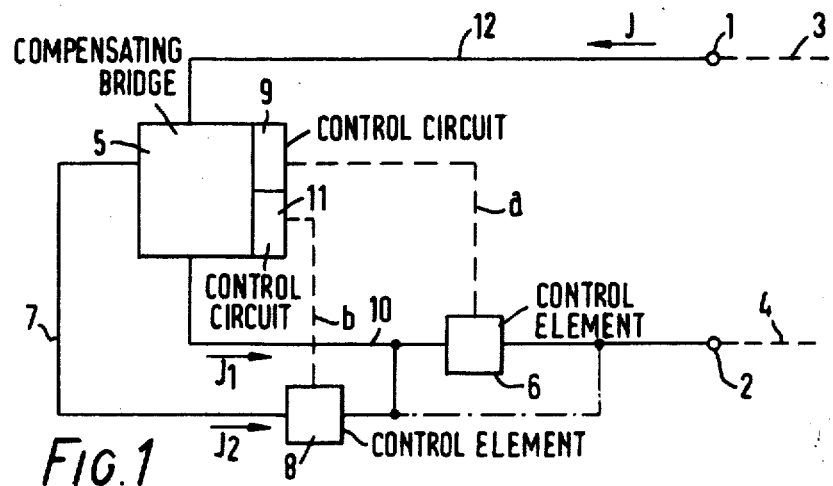
FIG. 1 is a block diagram of a converter according to the invention.
Figure 2:
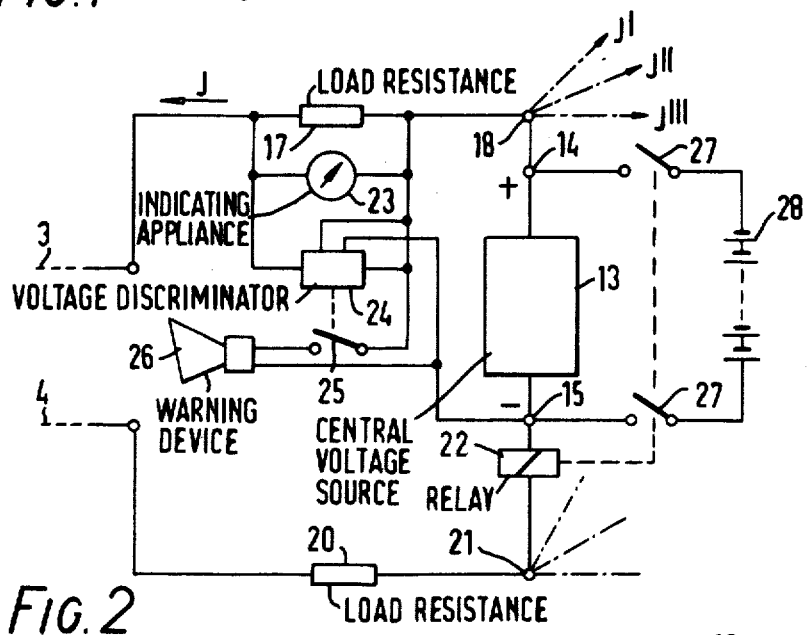
FIG. 2 is a simplified circuit diagram of the associated central control.

According to FIG. 1, the converter for measured quantities is a dipole with terminals 1 and 2 connected through signal lines 3 and 4 to a central control which is shown in FIG. 2. A control element 6 and a compensating bridge 5 containing a measuring resistance are connected in series between the terminals 1 and 2. In a current path 7 leading from the compensating bridge 5 there is a further control element 8. A first control signal $a$ is obtained from the bridge 5 by means of a first control circuit 9, the signal $a$ controlling the control element 6 in such a way that the sum of the current $J_1$ flowing through the entire bridge in the line 10 is substantially constant. A further control signal $b$ from a second control circuit 11 influenced by the bridge acts on the control element 8 in such a way that a compensating current $J_2$ flows through the current path 7 to keep the bridge in balance. The closed circuit current is $J_1$ and the signal current is $J_2$. Both currents result in a total current J in the common lead 12.

The central control comprises a central voltage source 13 having a plus pole 14 and a minus pole 15. The signal line 3 is connected through a terminal 16 and a load resistance 17 to a distributing point 18 which is connected directly to the plus pole 14. The signal line 4 is connected through a terminal 19 and a load resistance 20 to a distributing point 21 which is connected through a relay 22 to the minus pole 15.

Figure 3:
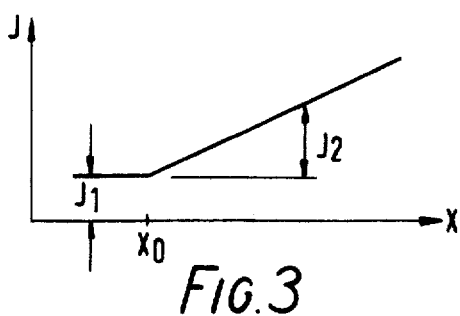
FIG. 3 is a graph showing the signal current I in relation to the measured quantity X.

The central voltage source 13 drives the current J through the signal lines 3 and 4. As shown in FIG. 3, only the supervising current $J_1$ will flow under a predetermined working point $X_0$ which represents the lower limit of the measuring range, whereas in the working range the current $J_2$ will also flow.

The current J can for example be utilised at the central control in that the voltage drop at the load resistance 17 actuates a measuring or indicating appliance 23. The voltage drop can also be applied to a voltage discriminator 24 which supervises the limiting value and which, when a predetermined limiting value is exceeded, operates a switch 25 for actuating a warning device 26, e.g. an acoustic signal. The discriminator 24 and warning equipment 26 are also energised by the central voltage source 13.

Numerous measuring systems of the kind hereinbefore described can be connected to the distributing points 18 and 21. Appropriate conduits are indicated in chain-dotted lines. Currents $J'$, $J''$, $J'''$ etc. will then flow through them. The sum of these currents flows through the relay 22. The latter will thereby hold open the double switch 27 to which an auxiliary voltage source, namely a battery 28, may be applied to the poles 14 and 15. If no current flows through the relay 22, this will be an indication that the central voltage source 13 is inoperative. The auxiliary voltage source 28 will then be switched in automatically. The double switch is locked in the closed position.

If individual measuring points are out of action, i.e. if the current through the signal lines drops to below the value $J_1$, this can be determined with the aid of a discriminator 24 and the fault can then be repaired.

Figure 4:
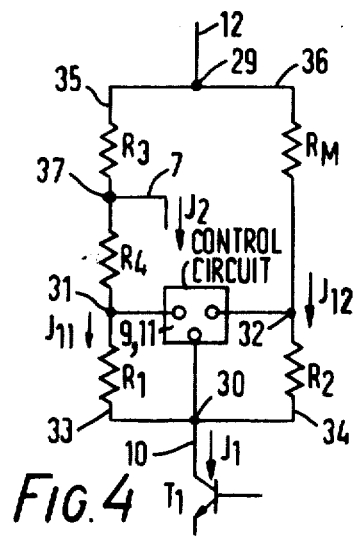
FIG. 4 is a circuit diagram of a bridge that can be used for the purpose of the present invention.

FIG. 4 illustrates a compensating bridge having two feed points 29 and 30 as well as two diagonal points 31 and 32. The bridge has four branches 33, 34, 35 and 36. The first branch 33 contains a fixed resistance $R_1$, the second branch 34 a fixed resistance $R_2$, the third branch fixed resistances $R_3$ and $R_4$ connected in series with a tap 37 for connecting the current path 7 between them, and the fourth branch 36 a measuring resistance $R_M$. The control circuits 9 and 11 are connected to the feed point 30 and to the diagonal points 31 and 32. A current $J_{11}$ flows through the branches 33 and 35 and a current $J_{12}$ through the branches 34 and 36. The sum of these currents results in the current $J_1$ that is to be kept constant.

The voltage between the points 31 and 32 serves to control the bridge compensation, i.e. particularly the current $J_2$. The voltage drop at the resistance $R_1$ or at the resistance $R_2$ or, better still, the mean value of the two voltage drops for which the voltages at the points 30, 31 and 32 will therefore be taken into consideration, serves to control the control element 6 which is here represented by its last resistor $T_1$. Depending on the extent of the voltage drop or the deviation of the mean value from a predetermined constant voltage, the transistor $T_1$ will alter its transmissibility so that $J_1$ will remain substantially constant.

Figure 5:
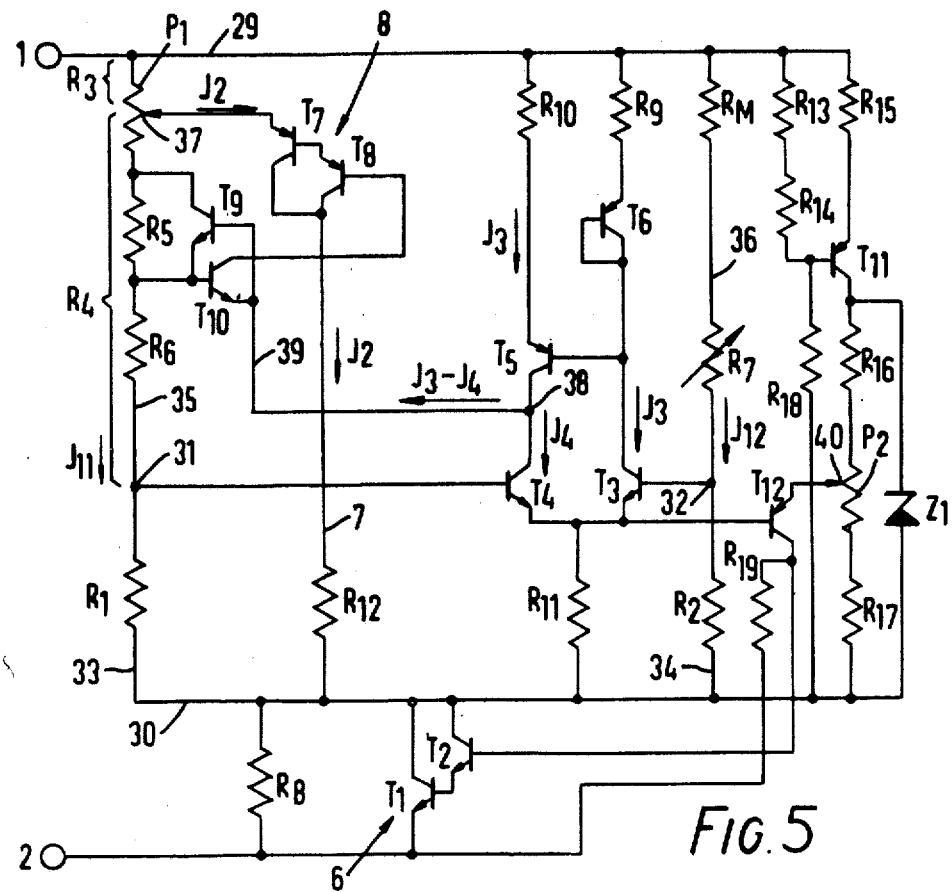
FIG. 5 is a circuit diagram of a converter using the bridge of FIG. 4.

FIG. 5 illustrates a circuit diagram for a converter that makes use of the FIG. 4 bridge. Similar parts have been provided with like reference numerals. The tap 37 is located at a voltage divider $P_1$ which is disposed with fixed resistances $R_5$ and $R_6$ in the branch 35. Together with the measuring resistance $R_M$, a control resistance $R_7$ is provided in the branch 36. The transistor $T_1$ of the control element 6 is connected in cascade with a transistor $T_2$. The emitter-collector path thereof is bridged by a starting resistance $R_8$.

Disposed in the bridge diagonal between the points 31 and 32 there are the inputs of a differential amplifier comprising a first transistor $T_3$ and a second transistor $T_4$, associated collector working resistances $R_9$ and $R_{10}$ and a common emitter resistance $R_{11}$. A transistor $T_5$ complementary with $T_3$ and $T_4$ serves as output resistance. A preferably complementary further transistor $T_6$ wired as a diode compensates disturbing influences through $T_5$. A junction 38 is located between the collector of the transistor $T_5$ and the collector of the transistor $T_4$. A current $J_3$ dependent on the voltage at the diagonal point 32 flows through the first transistor $T_3$. A current $J_4$ dependent on the voltage at the diagonal point 31 flows through the second transistor $T_4$. The current $J_3$ is also forced to flow through the output transistor $T_5$. Consequently, a differential current $J_3 - J_4$ flows through a line 39 leading from the junction 38 and this differential current may be positive or negative depending on the diagonal voltage.

A first means for restoring the bridge balance consists of the control element 8 in the form of a signal current transistor amplifier in the current path 7. It consists of the transistors $T_7$ and $T_8$ connected in cascade. This amplifier is in series with a resistance $R_{12}$. Second means for restoring the bridge balance comprise a control resistor $T_9$ of which the collector-emitter path is connected as a variable resistance parallel to the fixed resistance $R_5$. The base of this transistor $T_9$ is controlled directly by the current difference $J_3 - J_4$. The emitter of this transistor $T_9$ is connected to the base of a transistor $T_{10}$ of which the emitter is connected to the line 39 and the collector is connected to the input base of the current signal transistor amplifier 8. If the diagonal voltage deviates from zero in one direction, a signal current $J_2$ will accordingly flow through the current path 7. However, if the diagonal voltage deviates from zero in the other direction, the signal current $J_2$ will be zero and compensation is effected in that the voltage drop at the resistance $R_5$ is reduced with the aid of the control transistor $T_9$. Thus, even if the measuring resistance $R_M$ has a value beyond its operating range, compensation of the bridge will be ensured. As in the case of the differential amplifier, means hereinafter described for obtaining a constant voltage are applied to the feed points 29 and 30 of the bridge. These means comprise numerous resistances $R_{13} - R_{18}$, a voltage divider $P_2$ with a tap 40, a transistor $T_{11}$ and a Zener diode $Z_1$. With the aid of this arrangement, a selected constant voltage can be derived at the tap 40. This is compared in a comparative transistor $T_{12}$ with the voltage drop at the emitter resistance $R_{11}$. Its collector controls the input base of the control element 6. A resistance $R_{19}$ connects the collector to the terminal 2. If, with the aid of the comparative transistor $T_{12}$, it is determined that the mean value of the voltage drops at the fixed resistances $R_1$ and $R_2$ no longer coincides with the set constant voltage 40, the control element 6 is adjusted until equilibrium is restored. This corresponds to a condition in which the sum of $J_{11}$ and $J_{12}$ is substantially equal to the desired value.

The desired value for the constant current sum $J_1$ can be set with the aid of the voltage divider $P_2$. The zero point the signal current $J_2$, i.e. the working point $X_0$ (FIG. 3) can be set with the aid of the control resistance $R_7$. The gradient of $J_2$, i.e. the sensitivity of the converter, can be varied with the aid of the potentiometer $P_1$.

If the requirements of accuracy are less severe, the control transistor $T_9$ can be omitted, especially in cases where the resistances $R_1$ and $R_2$ are reasonably equal. Also, the transistor $T_{11}$ can be omitted. It only provides the possibility of compensating temperature influences which occur at the base-emitter path of the transistors $T_3$ and $T_4$, for example when using an NTC resistance $R_{13}$. The resistance $R_{12}$ limits the signal current in cases where the resistance $R_M$ is faulty. The energy consumption for the amplifier and voltage stabilising means can be kept so small that more than 3.7 mA of the supervising current of 4 mA are available for the bridge. Further, the current path 7 can be introduced in the line 10 downstream of the control element 6, as shown in chain-dotted lines in FIG. 1.

Figure 6:
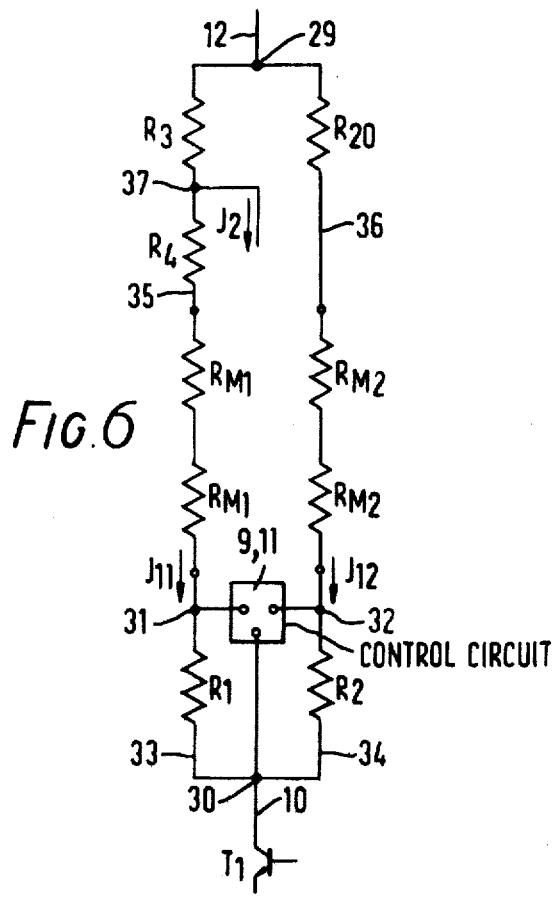
FIG. 6 is an illustration of a modified form of bridge.

In FIG. 6, the bridge of FIG. 4 is supplemented in so far that instead of a measuring resistance $R_M$ there are two measuring resistances $R_{M1}$ in the third branch 35 as well as two measuring resistances $R_{M2}$ in the fourth branch 36, which have an opposite tendency of variation and may, for example thus be the resistances of strain gauge strips. For balancing purposes, an additional resistance $R_{20}$ is provided in the fourth branch 36 and this is equal to the sum of the resistances $R_3$ and $R_4$. In other respects the bridge operates in the same way as already described in relation to FIGS. 4 and 5.

Figure 7:
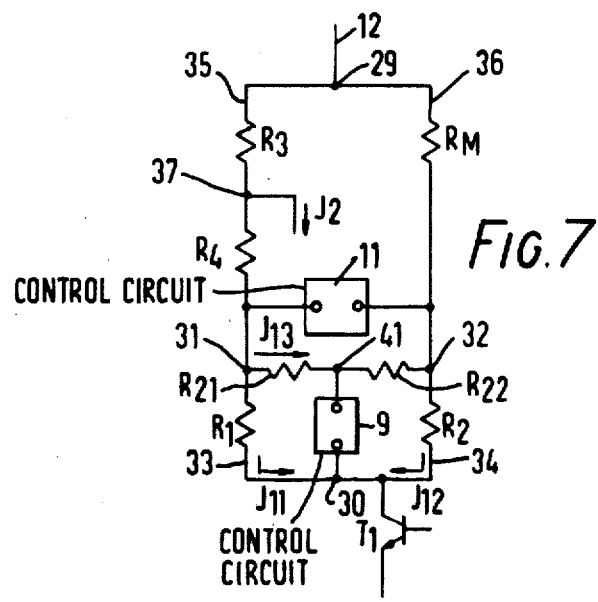
FIG. 7 shows a further embodiment of the bridge.

The bridge of FIG. 7 differs from the FIG. 4 bridge in that the diagonal points 31 and 32 are interconnected through a voltage divider consisting of the resistances $R_{21}$ and $R_{22}$. This voltage divider has a tap 41. A current $J_{13}$ flows through the voltage divider from one side of the bridge to the other. This current does not change the sum $J_1$ of currents but only the voltage drops at the resistances $R_1$ and $R_2$. A balanced mean value of the voltage is therefore tapped between the tap 41 and the feed point 30. This balanced mean value influences the first control means 9. The diagonal voltage influences the second control means 11.

Figure 8:
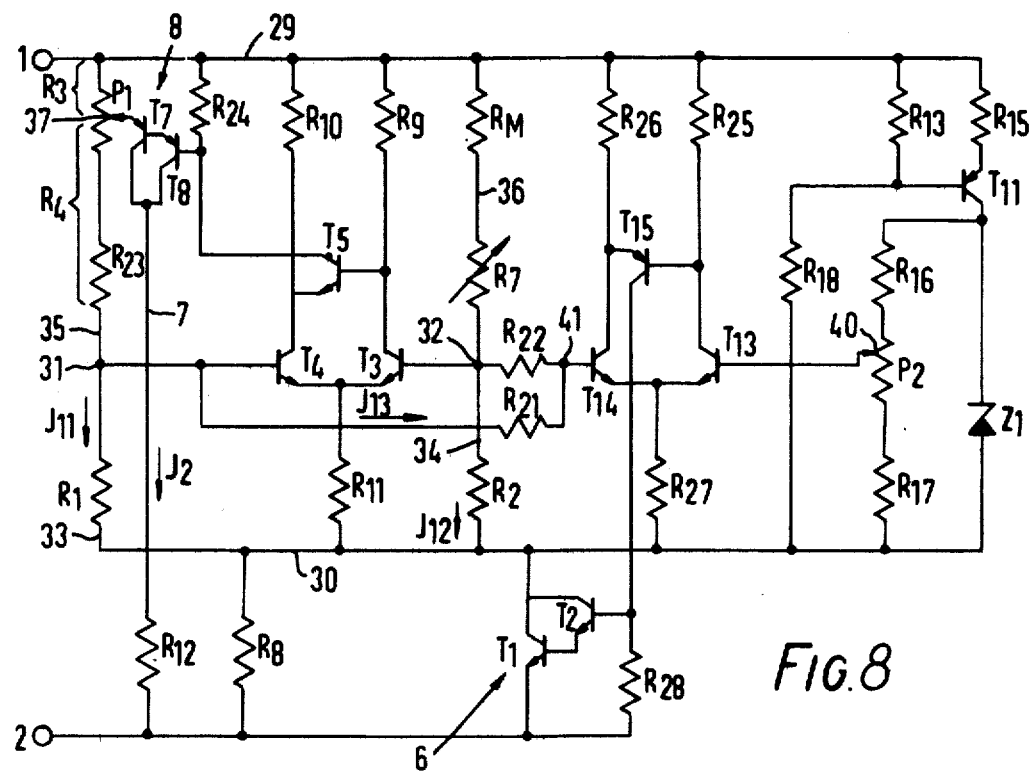
FIG. 8 illustrates a converter using the FIG. 7 form of bridge.

FIG. 8 illustrates a converter incorporating the bridge of FIG. 7. Like components are here given the same reference numerals as in the preceding figures. The current path 7 is this time connected downstream of the control element 6 and therefore directly to the terminal 2. The resistances $R_5$ and $R_6$ in the bridge branch 35 have been replaced by a resistance $R_{23}$. The differential amplifier with transistors $T_3$ and $T_4$ only controls the signal current transistor amplifier 8, the collector working resistance $R_{24}$ of the output transistor $T_5$ lying between the input base of the transistor $T_8$ and the bridge feed point 29.

Connected between the taps 40 and 41 there are the inputs of a comparative differential amplifier having transistors $T_{13}$ and $T_{14}$ which are associated with two collector working resistances $R_{25}$ and $R_{26}$ as well as a common emitter resistance $R_{27}$. The differential amplifier has an output transistor $T_{15}$ of which the collector is connected to the terminal 2 through a working resistance $R_{28}$ and directly to the input base of the control element amplifier 6. This differential amplifier ensures that, when the voltage at the tap 41 differs from the predetermined constant voltage at the tap 40, the control element 6 varies its transmissive resistance in such a way that the sum of the currents $J_{11}$ and $J_{12}$ flowing through the entire bridge is constant.

The converter has general applications. In a low-ohmic senser one can pass the largest possible sensing current through the associated bridge branch. If, conversely, a high-ohmic senser is used, a high current can flow through the other bridge branch. However, the system will also work if the resistances in both bridge branches are substantially equal. The illustrated transistors could also be replaced by complementary transistors with a corresponding type of connection. The amplifier with the junction 38 in FIG. 5 may also be employed in the embodiment of FIG. 8.

I claim:

1. An electric circuit arrangement for supplying an electric signal current in dependence upon a measured value of a physical quantity, the circuit arrangement comprising a compensating bridge circuit having a plurality of arms including fixed value resistances and at least one measuring resistance, in which bridge circuit the signal current is supplied through at least one of said fixed value resistances for restoring the balance of the bridge circuit, a control element connected in series with the bridge circuit, and means to derive a control signal in dependence upon the voltage drop across at least one of the other of said fixed value resistances and to supply said control signal to said control element whereby the control element varies the voltage across the bridge circuit such that the sum of the currents flowing through the bridge circuit is maintained substantially constant.

2. A circuit arrangement according to claim 1 wherein said means to derive a control signal comprises means for deriving the mean value of the voltage drop across said fixed value resistances in two of said arms of said bridge circuit, and for comparing the means value so obtained with a constant voltage for the purpose of forming said control signal.

3. A circuit arrangement according to claim 2 wherein said bridge circuit comprises first, second, third and fourth arms, and first and second feed points connected to the junctions of said first and second and said third and fourth arms respectively, and wherein said first and second arms each comprise a fixed value resistance, said third arm comprises a fixed value resistance having an intermediate tap, a path being connected to said intermediate tap for carrying said signal current, and said fourth arm comprises at least one said measuring resistance.

4. A circuit arrangement according to claim 3 wherein said third arm comprises a said measuring resistance, the values of said measuring resistances in said third and fourth arms varying in opposite senses respectively.

5. A circuit arrangement according to claim 2 wherein said means to derive a control signal comprises a transistor differential amplifier comprising a pair of transistors each having base, emitter and collector, and a common emitter resistance, the base of one transistor of said pair being connected to the junction of said second and third arms and the base of the other transistor of said pair being connected to the junction of said first and fourth arms and a transistor amplifier for comparing the voltage drop across said common emitter resistance with a constant voltage for the purpose of forming said control signal.

6. A circuit arrangement according to claim 5 wherein said transistor amplifier comprises a transistor having base, emitter and collector which is complementary to said transistor of the differential amplifier, the base of said transistor of the transistor amplifier being connected to the emitters of the transistors of the differential amplifier, the emitter of said transistor of the transistor amplifier being fed with said constant voltage, and the collector of said transistor of the transistor amplifier being connected to said control element which comprises a further transistor amplifier.

7. A circuit arrangement according to claim 2 wherein said means for deriving the mean value of the voltage drop across said fixed value resistances in two of said arms of said bridge circuit comprises a voltage divider.

8. A circuit arrangement according to claim 1 comprising further means to derive a further signal current for restoring the balance of said bridge circuit, said bridge circuit having a diagonal and said means to derive said first-mentioned signal current operating when the voltage across said diagonal deviates from zero in one sense, and said further means to derive a further control signal operating when said voltage across said diagonal deviates from zero in the other sense.

9. A circuit arrangement according to claim 8 wherein said further means to derive a further signal current comprises a controllable resistance connected in parallel with part of a said fixed value resistance in one of said arms of said bridge circuit.

10. A circuit arrangement according to claim 9 comprising a transistor having base, collector and emitter, said controllable resistance being formed by the collector-emitter path of said transistor.

11. A circuit arrangement according to claim 7 comprising a transistor differential amplifier having an output and two control inputs respectively connected to said voltage divider and also to the junction of said fixed value resistances in two of said arms of said bridge circuit and to said constant voltage, and a further transistor, said output being connected via said further transistor to said control element.

12. A bridge circuit for use in measuring a physical quantity, said bridge circuit having four terminals which form respectively two feed points for connection to a power supply and intermediate between said two feed points two diagonal points, and four branches connecting said points in pairs, a detector circuit connected between said two diagonal joints, said detector circuit providing an output for controlling a signal current in response to differences in voltage between said two diagonal points, said signal current passing through a part of the bridge circuit and restoring the bridge circuit to a balanced condition, means for generating a control signal in response to a mean value of the voltage differences across two said branches of said bridge circuit, and a control element connected in series with said bridge circuit, said control signal being applied to said control element to maintain the net current flowing out of one of said feed points at a substantially constant value.

* * * * *